United States Patent
Ichinose et al.

(10) Patent No.: US 8,380,381 B2
(45) Date of Patent: *Feb. 19, 2013

(54) ELECTRIC VEHICLE WITH PITCH CONTROL DEVICE

(75) Inventors: Masanori Ichinose, Tsukuba (JP); Tomohiko Yasuda, Kashiwa (JP); Takayuki Sato, Kashiwa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,912

(22) Filed: May 31, 2012

(65) Prior Publication Data

US 2012/0239234 A1    Sep. 20, 2012

Related U.S. Application Data

(63) Continuation of application No. 12/637,819, filed on Dec. 15, 2009, now Pat. No. 8,195,351.

(30) Foreign Application Priority Data

Dec. 15, 2008   (JP) ................................ 2008-317810

(51) Int. Cl.
   *G06F 7/00*   (2006.01)

(52) U.S. Cl. .................. 701/22; 701/84; 701/90; 477/7; 180/65.1

(58) Field of Classification Search ................. 701/22, 701/69, 70, 71, 72, 82, 90, 84; 180/65.1; 477/7, 15, 16; 280/5.502, 5.506, 5.507
See application file for complete search history.

(56) References Cited

U.S. PATENT DOCUMENTS

2002/0084599 A1   7/2002   Charaudeau et al.
2009/0085309 A1   4/2009   Hirao et al.

FOREIGN PATENT DOCUMENTS

JP    62-012305    1/1987

*Primary Examiner* — Richard M. Camby
(74) *Attorney, Agent, or Firm* — Antonelli, Terry, Stout & Kraus, LLP.

(57) ABSTRACT

An electric vehicle includes a pitching state quantity detector for detecting quantity of a pitching-motion of the vehicle, a vehicle weight determiner, a pitching target quantity calculator for calculating a target quantity of a pitching motion at least from the determined vehicle weight, and a torque correction calculator for increasing/reducing a driving torque output, according to a particular differential between the detected pitching-motion state quantity and the calculated target quantity.

12 Claims, 4 Drawing Sheets

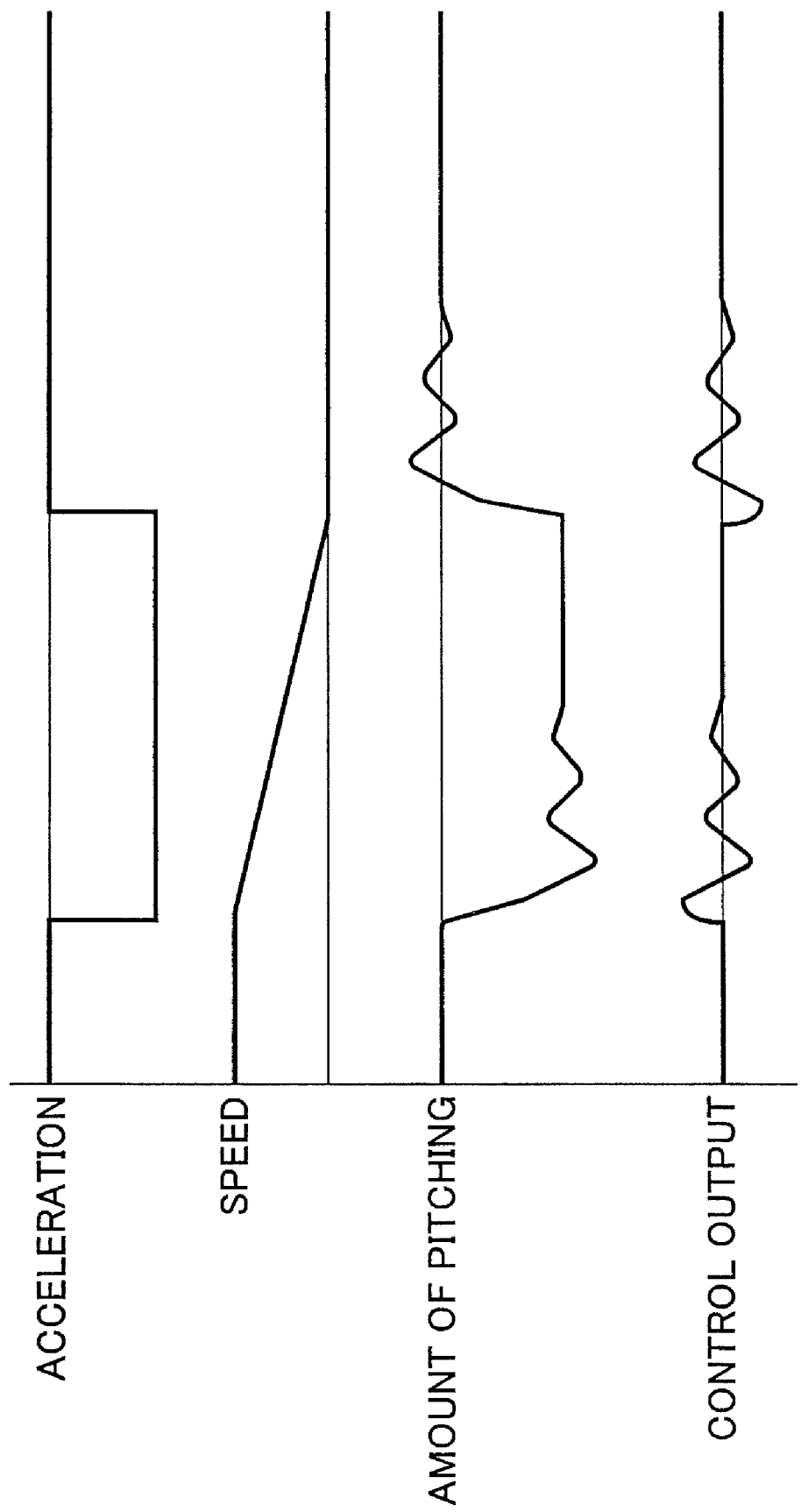

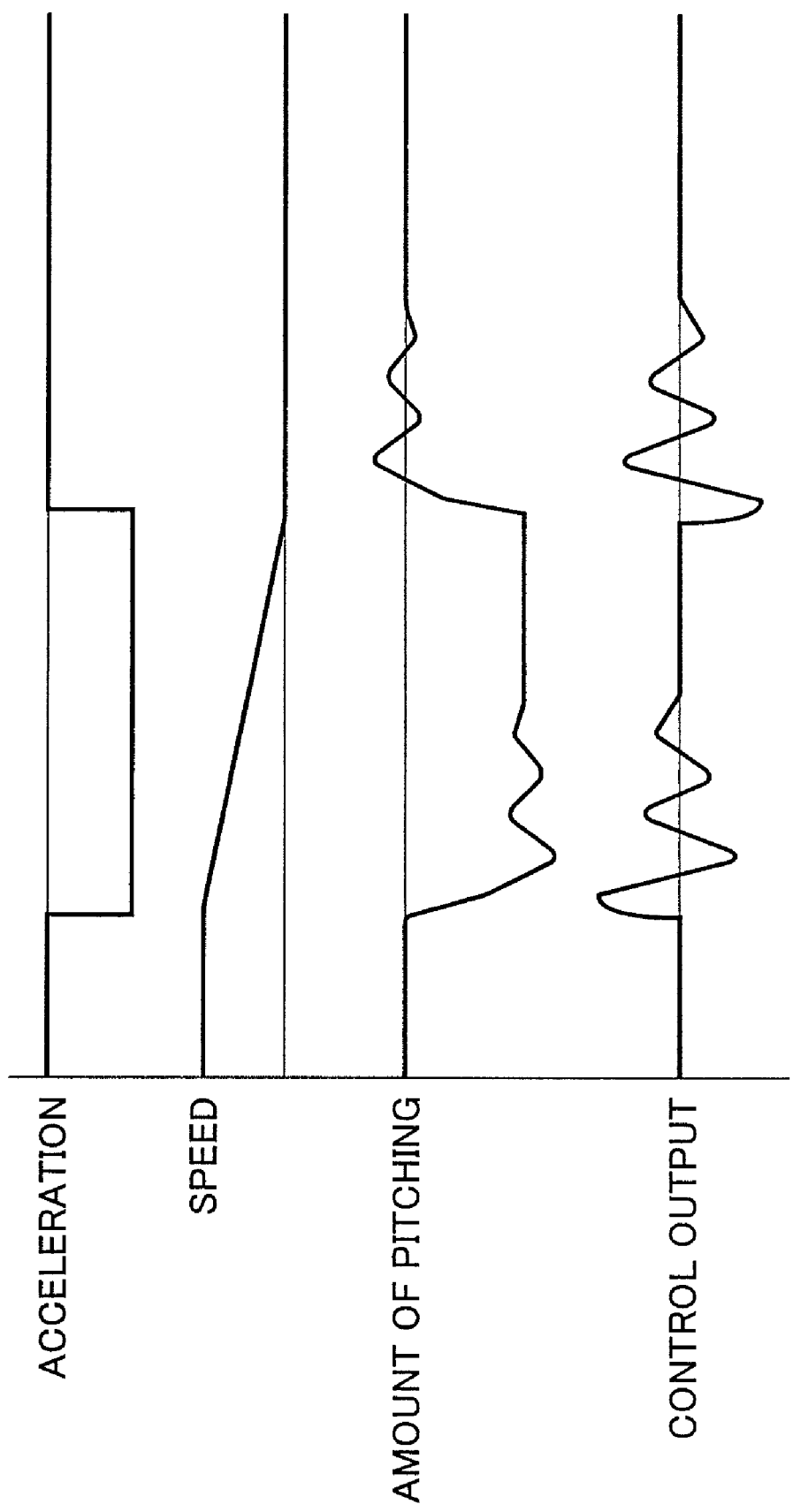

ELECTRIC VEHICLE WITH PITCH CONTROL DEVICE

CROSS REFERENCE TO RELATED APPLICATION

This application is a continuation of U.S. application Ser. No. 12/637,819, filed Dec. 15, 2009 now U.S. Pat. No 8,195,351, the contents of which are incorporated herein by reference.

BACKGROUND OF THE INVENTION

1. Field of the Invention

The present invention relates generally to electric vehicles, and more particularly, to a technique for suppressing a pitching motion of an electric vehicle.

2. Description of the Related Art

Movement of attitude that is determined by expansion and contraction of the suspension mounted on vehicle's front and rear wheels is called the pitching motion, and the attitude changes according to the particular traveling state of the vehicle or the particular state of the road surface. For example, accelerating or decelerating the vehicle generates a pitching moment, the moment about the gravitational point of center, in the direction where the longitudinal direction of the vehicle chassis changes upwardly or downwardly, and the pitching moment causes the pitching motion. If the road surface on which the vehicle is traveling has bumps, the pitching motion will also result from vertical vibration of the front and rear wheels with a difference in time.

In order to suppress such changes in attitude due to the pitching motion, the vehicle has a suspension system that includes springs and dampers for damping the vibration of the wheels.

The vehicle is adjustable in both riding comfort and steering stability by assigning characteristics to the springs and dampers in the suspension system, but it is very difficult to balance riding comfort and steering stability. This is because, since riding comfort and steering stability are contradictory characteristics and since the actual vehicle weight changes significantly with the number of passengers and the quantity of goods loaded, optimal data that allows response to all situations is difficult to determine.

Meanwhile, there is known a technique (refer to JP-62-12305-A, for example) that is intended for complementing the functionality of a suspension by controlling the driving force of the vehicle to stabilize the attitude of the vehicle chassis. The technique described in JP-62-12305-A suppresses the pitching motion of the vehicle by responding appropriately. More specifically, if the front wheel of the vehicle chassis moves upward, the vehicle is reduced in driving torque by utilizing road-surface repulsion to reduce the moment applied in the direction that the front wheel moves upward, and conversely if the front wheel moves downward, the vehicle is increased in driving torque by utilizing road-surface repulsion to increase the moment applied in the direction that the front wheel moves upward.

SUMMARY OF THE INVENTION

The conventional technique disclosed in JP-62-12305-A, however, operates the vehicle so that in order to suppress the pitching motion of the vehicle chassis, the driving torque of the vehicle is increased/reduced with a phase inverse to that of the pitching motion.

However, the absence of a system in which the control gain for determining the increase/reduction rate is effectively varied according to the particular state of the vehicle has posed a problem in that for example, when the vehicle weight significantly changes with a change in the number of passengers or in carrying load, the necessary increment/decrement in torque will also change to make appropriate increase/reduction control of the driving torque impossible.

In addition, since the driving torque of the vehicle is increased/reduced to cancel the magnitude itself of the pitching motion originally unavoidable during speeding-up/slowdown, the driving torque required for the acceleration/deceleration is liable to be reduced more than necessary and thus result in reduced vehicle controllability, which is undesirable.

The present invention has been made with attention focused upon the above problems, and an object of the invention is to provide a pitching-controllable electric vehicle adapted to control a pitching motion of the vehicle properly by controlling a driving force thereof in order to suppress any changes in attitude due to the pitching motion, and to enhance steering stability, while at the same time ensuring proper riding comfort of passengers, even in case of significant changes in vehicle weight due to increases/decreases in the number of passengers or in the quantity of goods loaded.

In order to achieve the above object, an electric vehicle according to the present invention comprises a drive including a motor and a controller; the electric vehicle comprising: pitching state detection means for detecting a state of a pitching motion of the vehicle; vehicle weight determination means for determining weight of the vehicle; pitching target quantity calculation means for predicting a pitching-motion state quantity of the vehicle from a traveling state thereof and from the determined vehicle weight; a torque correction calculator for increasing/reducing a driving torque output from the drive; and control gain varying means for adjusting a control gain of the torque correction calculator according to a magnitude of the vehicle weight.

In order to achieve the above object, another electric vehicle according to the present invention comprises a drive including a motor and a controller; the electric vehicle further comprising pitching state detection means for detecting a state of a pitching motion of the vehicle, vehicle weight determination means for determining vehicle weight thereof, pitching target quantity calculation means for calculating a pitching state quantity of the pitching motion of the vehicle on the basis of the traveling state and weight of the vehicle, a torque correction calculator for increasing/reducing a driving torque output from the drive, and control gain varying means for changing an internal control gain of the torque correction calculator as appropriate; wherein the torque correction calculator increases/reduces the driving torque of the drive according to a particular differential between the pitching-motion state quantity that the pitching state detection means has detected, and the target quantity that the pitching target quantity calculation means has calculated, and the control gain varying means adjusts the control gain of the torque correction calculator according to a particular output value of the vehicle weight from the vehicle weight determination means.

The present invention is advantageous in that even if increases/decreases in carrying load and in the number of passengers cause significant changes in vehicle weight, the passengers or the carrying load is stabilized and steering stability can also be enhanced.

BRIEF DESCRIPTION OF THE DRAWINGS

FIG. 4 is a diagram that schematically represents input/output signals of the pitching control device existing under an unloaded state of the electric vehicle; and FIG. 5 is a diagram that schematically represents input/output signals of the pitching control device existing under a loaded state of the electric vehicle.

DESCRIPTION OF THE PREFERRED EMBODIMENTS

The best mode of carrying out the present invention, based upon an exemplary embodiment, will be described hereunder.

First, a configuration of the present invention will be described.

Figure 1:
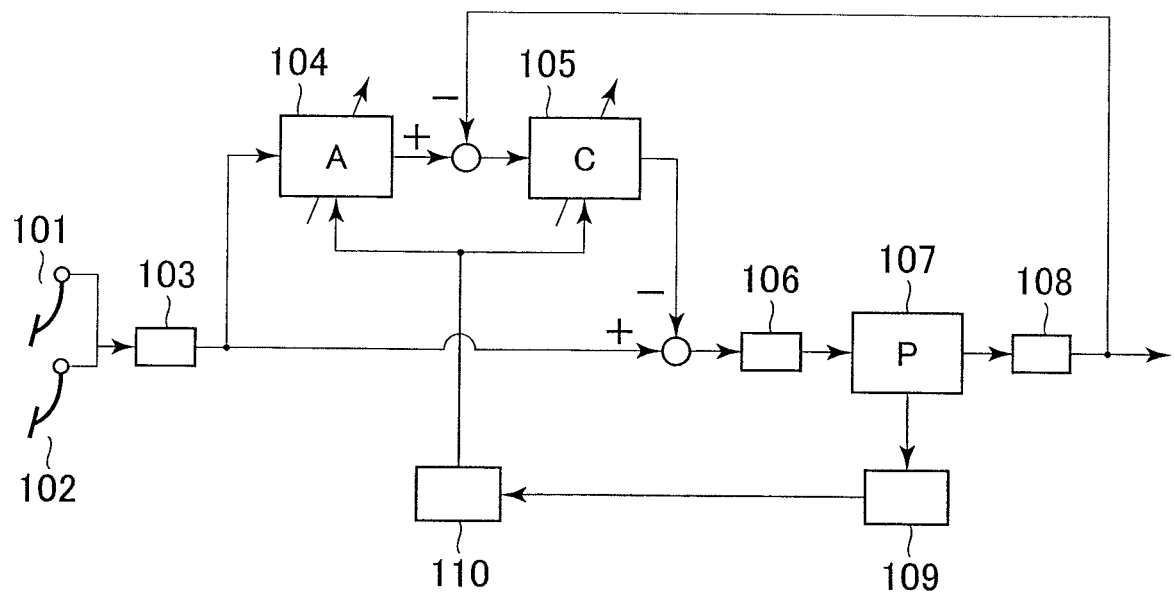
FIG. 1 is a total configuration block diagram of a pitching control device in an electric vehicle according to an embodiment of the present invention.

FIG. 1 is a total configuration block diagram of a pitching control device or a pitch control device in an electric vehicle according to an embodiment of the present invention. The electric vehicle applying the embodiment of the present invention is described below using FIG. 1.

An accelerator pedal 101 and a brake pedal 102 are operating parts for input of a driver's accelerating request and decelerating request, and both pedals are connected to a driving torque command data calculator 103. The driving torque command data calculator 103 calculates necessary driving torque command data based upon the driver's accelerating and decelerating requests. The driving torque command data that the driving torque command data calculator 103 has calculated is input to a pitching target quantity calculation means 104 as well as to a drive 106.

The pitching target quantity calculation means 104 estimates an acceleration of the vehicle from the input driving torque command data, and calculates a pitching target quantity from the acceleration of the vehicle, weight thereof, inertial moment thereof, height of a gravitational center thereof, pitching rigidity of a suspension, and other vehicle parameters relating to traveling states of the vehicle. The thus calculated pitching target quantity, after removal of its differential relative to an actual pitching state quantity, is input to a torque correction calculator 105.

Conversely to the pitching target quantity calculation means 104, the torque correction calculator 105 calculates, from the input offset value of the pitching target quantity, the amount of driving torque correction needed to correct the amount of pitching, on the basis of the vehicle parameters. The driving torque command data that the driving torque command data calculator 103 has calculated is corrected before the amount of driving torque correction that the torque correction calculator 105 has calculated is input to the drive 106. The drive 106 has a motor and a controller, neither of which is shown, and the controller that has received the corrected driving torque command data drives the motor that connects to driving wheels, for example.

An actual plant 107 represents a response of a pitching motion in an actual vehicle. The actual vehicle has its actual pitching state quantity measured by a pitching state quantity detector 108 and then converted into a physical quantity, such as a pitching angle change or pitch rate (pitching angular velocity), that can be used in the control device. For example, detection with the pitching state quantity detector 108 would employ a method such as: detecting an attitude of the vehicle chassis from differential height by use of stroke sensors of the vehicle's front and rear suspensions; calculating the attitude of the vehicle chassis by estimating a change in position from a load exerted upon the suspension system; or calculating a change rate of the attitude of the vehicle chassis by estimating, from the acceleration acting upon a spring of the suspension system, a force that has been input to the vehicle chassis.

A major flow of control in the pitching control device for the electric vehicle in the present embodiment is as described above.

In the present embodiment, the pitching control device further includes a vehicle weight determination unit 109. The vehicle weight determination unit 109, mounted in the vehicle so as to calculate wheel loads of each wheel by multiplying, by a known suspension spring constant, the displacement of the corresponding suspension that has been detected using an element such as the stroke sensor of the suspension, and totalize the calculated wheel loads, is adapted to determine total vehicle weight that includes passengers, a carrying load, and the like as the pitching quantity described above. More accurately, the total vehicle weight in this case means weight of the vehicle chassis side supported by the suspension springs, and this weight is exclusive of weights of tires present under the springs, weights of the wheels and brakes, and weight of the motor existing when connected directly to the tires.

In addition to the above, a clearance between the vehicle chassis and the ground surface is measured, strain sensors are installed at a load-indicating section of the vehicle chassis and that of the suspension system, and other measuring/detecting elements are arranged. A method of weight determination, therefore, is not limited.

On the basis of the vehicle weight information thus obtained by the vehicle weight determination unit 109, a control gain varying element 110 conducts necessary changes and adjustments upon coefficients of numerical expressions and formulae for calculation of the pitching target quantity and driving torque correction data in the above-described pitching target quantity calculation means 104 and torque correction calculator 105. An appropriate pitching target quantity and appropriate driving torque correction data can thus be calculated, even if the vehicle weight changes. Among the most important vehicle parameters in handling the pitching motion is the vehicle weight, and any changes in the vehicle weight needs to be appropriately incorporated into the control device before effective pitching control can be realized.

In the electric vehicle that implements the pitching control described in the present embodiment, therefore, since the above constituent elements can be used to incorporate the vehicle weight changes into the control, the passengers or the carrying load can be stabilized, even if the vehicle weight changes, and hence, steering stability can be enhanced. This pitching control method is particularly suitable for transport devices such as trucks whose vehicle weights change significantly with a weight change of the carrying load.

Additionally, the pitching state detector may be an acceleration sensor mounted above the suspension system or in a neighboring region thereof.

Use of the acceleration sensor mounted above or near the suspension system makes measurable a magnitude of an acceleration of a vertical motion of the vehicle chassis, applied to upper sections of each axle on a chassis during the pitching motion. This feature, in turn, yields an advantageous effect in that the pitching acceleration of the vehicle and a pitching velocity based upon integration of the pitching acceleration can be easily measured. In addition, since acceleration sensors are, in general, inexpensive in comparison with other sensors such as stroke sensors, the use of the acceleration sensor is effective for reducing a total system cost.

The flow of pitching control in the electric vehicle of the present embodiment has been described above. More specific examples of formulation for the pitching motion, and of processing in the pitching target quantity calculation means 104 and torque correction calculator 105, are described in detail below.

Figure 2:
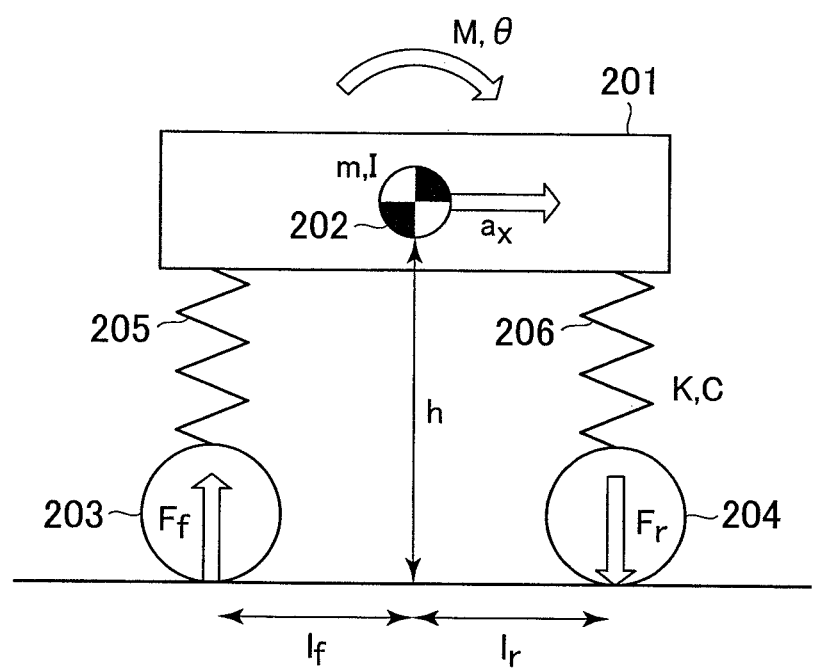
FIG. 2 is a diagram schematically illustrating a pitching motion of the vehicle.

FIG. 2 is a diagram schematically illustrating the pitching motion of the vehicle. Referring to FIG. 2, the vehicle chassis 201 is supportingly coupled to the front and rear wheels 203 and 204 by the front and rear suspensions 205 and 206, respectively, and the vehicle chassis 201 is thus supported. Let the weight of the vehicle chassis 201 be defined as "m" in FIG. 2, the inertial moment in the pitching motion as "I", a moment of the pitching motion as "M", and the amount of pitching as "θ".

Also, suppose that rigidity of the suspension system against the pitching motion is "K" and that a damping value is "C". Additionally, FIG. 2 assumes that the vehicle chassis 201 has a road clearance of "h" at a gravitational point of center, 202, thereof and that distances from the front wheel 203 and the rear wheel 204 to the gravitational point of center are "$I_f$" and "$I_r$", respectively.

If the driving torque command value that has been output from the driving torque command data calculator 103 is taken as "$T_a$", and a tire diameter of the driving wheel, as "$r_t$", the acceleration of the vehicle, "$a_x$", can be expressed as $$a_x = T_d/mr_t \quad (1)$$

where no tire slippage is assumed.

Consider here the amounts of load shift, "$F_f$" and "$F_r$", of the front and rear wheels due to an accelerating motion of the vehicle. Since a longitudinal accelerating motion of the gravitational point of center, 202, that is present at the height of "h" above the ground is supported with respect to the ground surface at the longitudinal distances of "$I_f$" and "$I_r$", the amounts of load shift, "$F_f$" and "$F_r$", that are forces then exerted upon the ground surface, are expressed as follows with the downward force taken as plus:

$$F_f = -2a_x mh/(I_f + I_r) \quad (2)$$

$$F_r = 2a_x mh/(I_f + I_r) \quad (3)$$

The moment M about the gravitational point of center due to the load shifts can be expressed as follows if a clockwise direction is taken as plus in FIG. 2:

$$M = -F_f I_f + F_r I_r \quad (4)$$

Substituting expressions (2) and (3) into expression (4) gives the following moment M about the gravitational point of center:

$$M = 2mh \cdot a_x \quad (5)$$

If a static balance of forces is considered, the amount of pitching, θs, that is obtained at this time appears as follows:

$$\theta s = M/K = (2mh/K)a_x \quad (6)$$

More simply, calculation of a pitching target value by the pitching target quantity calculation means 104 can use expression (6).

Meanwhile, a dynamic transfer function of the pitching motion of the vehicle chassis 201 due to the moment M about the gravitational point of center is expressed as $$\theta(s)/M(s) = 1/(Is^2 + Cs + K) \quad (7)$$

so the amount of pitching that allows for up to dynamic characteristics of the suspension system can be expressed as follows by substituting expression (5) into expression (7):

$$\theta(s) = 2mh/(Is^2 + Cs + K) \cdot a_x(s) \quad (8)$$

The pitching target value desirably uses the amount of pitching, θ, that is calculated using expression (8)', wherein $C_t$ is a damping value that allows for compatibility between riding comfort, immediate responsiveness to acceleration/deceleration, and drivability.

$$\theta(s) = 2mh/(Is^2 + C_t s + K) \cdot a_x(s) \quad (8)'$$

The numerical expressions described above do not include any impacts of the moment due to driving repulsion, upon a suspension arm. However, these impacts due to the driving repulsion need to be further taken into account in the actual control, but a magnitude of the impacts is not described herein since it significantly differs according to a particular type of the suspension system.

The method as described above allows the pitching target quantity calculation means 104 to calculate the pitching target quantity and take the differential relative to the actual pitching state quantity measured by the pitching state quantity detector 108. In this manner, a pitching momentum that requires correction based upon control can be calculated.

It suffices for the torque correction calculator 105 to calculate a necessary acceleration/deceleration "$a_c$" from an offset $\Delta\theta$ of the pitching target quantity, and determine a necessary driving torque correction value. For ease in processing, expression (6) can be used in an inverse form to calculate the acceleration/deceleration required for the correction of the pitching motion. More specifically, the acceleration/deceleration "$a_c$" can be obtained by solving, for the acceleration "$a_x$", expression (6) for calculating the amount of pitching, θs, from the acceleration "$a_x$". That is to say, the acceleration/deceleration "$a_c$" expressed by $$a_c = G_k \cdot (K/2mh) \cdot \Delta\theta \quad (9)$$

is the physical quantity required for control. Referring to expression (9), "$G_k$" is a proportional control gain for the amount of pitching. Additionally, apart from this discussion, if a control target value for the pitching motion is to be handled as a reduction in pitch rate (i.e., pitch rate target value=0), an acceleration/deceleration "$a_d$" expressed by $$a_d = G_d \cdot \theta' \quad (10)$$

can be used to control the damping of the pitching motion independently of the dynamic characteristics of the system. Referring to expression (10), θ' is the pitch rate and "$G_d$" is a differential control gain for the amount of pitching. It follows from the above that the driving torque value as obtained by execution of the pitching control calculated using expressions (9) and (10) will be:

$$a_{cont} = a_x - a_c - a_d \quad (11)$$

A controller with a transfer function which allows for the dynamic characteristics of the entire closed-loop system while at the same time satisfying the acceleration/deceleration "$a_{cont}$" is preferably designed for the torque correction calculator 105.

General vehicles employ nonlinear springs in respective suspension systems to achieve compatibility between riding comfort and steering stability. In general, therefore, the rigidity K of the suspension system in the foregoing expressions becomes a function of the vehicle weight "m", and a change in the vehicle weight "m" also changes the amount of deflection of the suspension system to nonlinear. As the number of passengers and/or the weight of the load changes, the gravitational position of the vehicle chassis also changes, which in turn varies the gravitational height "h" significantly with the change in the amount of deflection of the suspension system. These factors need to be considered when a control system design adapted to accommodate such volumetric changes is conducted for the pitching target quantity calculation means 104 and the torque correction calculator 105.

Figure 3:
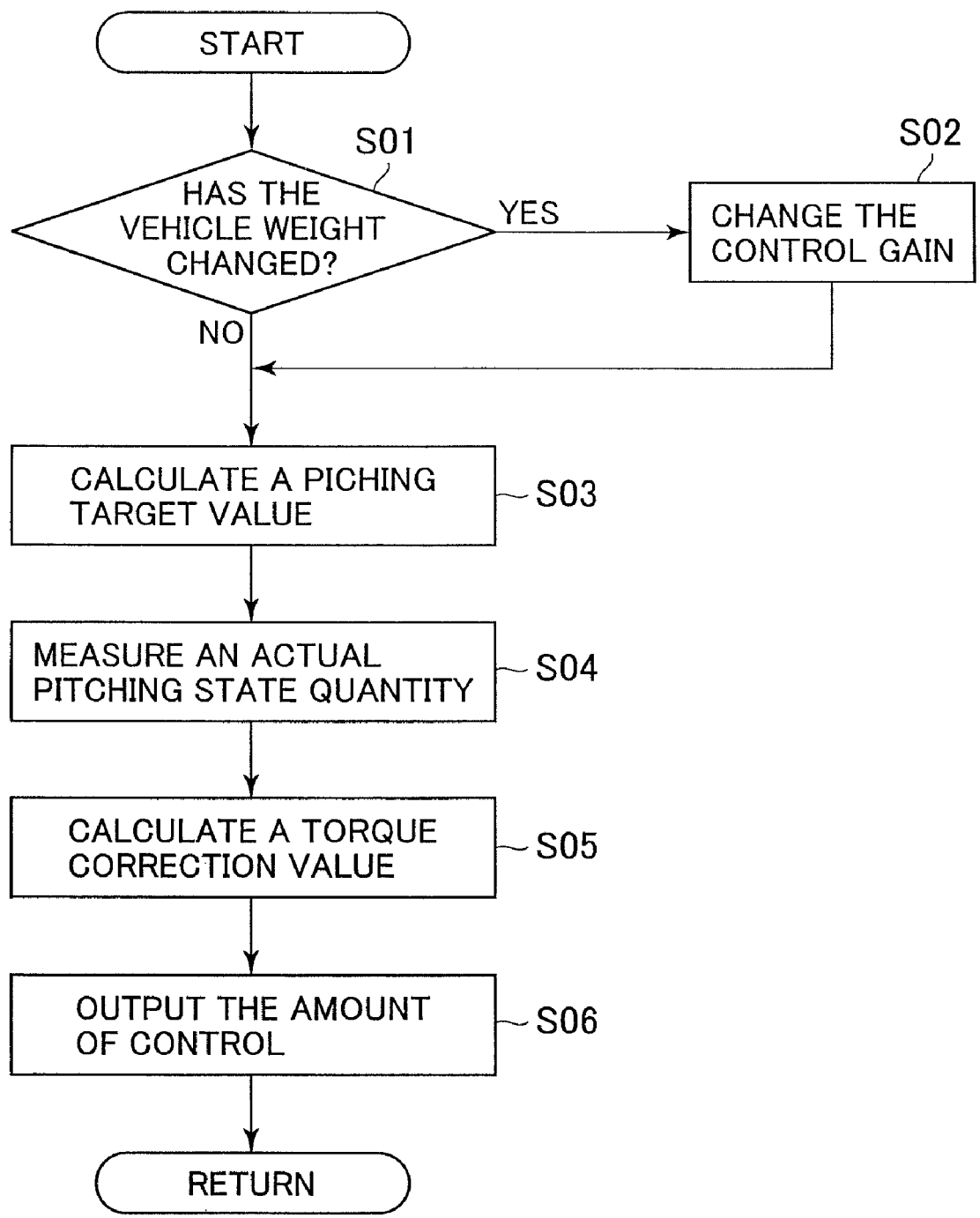
FIG. 3 is a diagram illustrating a flow of processing in the pitching control device of the electric vehicle according to the embodiment.

FIG. 3 is a diagram illustrating a flow of processing in the pitching control device of the electric vehicle according to the present embodiment. In step S01, the control device first checks for a change in vehicle weight. If a change in vehicle weight due to a change in load-carrying state is detected, the control device changes the control gain in step S02. In step S03, the control device calculates the pitching target value based upon the acceleration/deceleration that has been determined from the amounts of operation of the accelerator and brake pedals. Next, the control device measures the actual pitching state quantity of the vehicle in step S04.

In step S05, the control device calculates the torque correction value from the differential between the pitching target value and the actual pitching state quantity. Finally, in step S06 the control device outputs an appropriate control value to the outside (i.e., the driving torque command value that has been corrected with the driving torque correction value is output to the drive 106). This completes processing.

As described above, the control device for controlling the pitching motion of the vehicle needs to be constructed to allow adjustment to the control gain allowing for the vehicle weight (and the pitching inertial moment of the vehicle chassis), and the pitching control device in the electric vehicle of the present embodiment uses the control gain varying element 110 to conduct control gain changes/adjustments based upon the vehicle weight information obtained by the vehicle weight determination unit 109.

FIGS. 4 and 5 are diagrams that schematically represent input/output signals of the pitching control device existing when it changes/adjusts the control gain in the electric vehicle of the present embodiment. FIG. 4 represents an unloaded state of the vehicle, and FIG. 5 represents a loaded state of the vehicle. Both figures assume that the vehicle is in a stopped condition after decelerating at a constant slowdown rate from a certain time.

If it is assumed that the vehicle is decelerating for the amounts of pitching in the figures to be essentially of the same level, the measured amounts of pitching are input to the pitching control device, so this means that the input signals are essentially of an equal level. If the input values to the pitching control device are essentially equal, control outputs are also essentially equal, but since the pitching control device in the electric vehicle of the present embodiment changes/adjusts the control gain according to the particular vehicle weight, a magnitude of the control outputs varies according to the vehicle weight, even if the input values are essentially equal. Both figures indicate increases in the vehicle weight "m" and the nonlinear spring constant "K" of the suspension due to presence of the control gain varying element 110, and hence, increases in control gain.

As described above, in the present embodiment, the control gain varying element 110 changes/adjusts the control gain on the basis of the vehicle weight information obtained by the vehicle weight determination unit 109. Thus, changes in vehicle weight are incorporated into control, and reliable and highly precise control insusceptible to any changes in the loading state of the vehicle can be achieved, even in such transport devices as the trucks whose vehicle weights significantly change with a volumetric change in truckload, in particular.

Next, the pitching state quantity detector 108 is described below. As described above, the pitching state quantity detector 108 detects the attitude of the vehicle from, for example, the differential height obtained using the stroke sensors of the front and rear suspension devices. However, the detection requires installing a special device that measures the suspension stroke.

In recent years, a suspension system that uses an air pressure or an oil pressure is coming into common use primarily in trucks, buses, and the like, for improved controllability of riding comfort. In order to meet operational necessity of the suspension systems in these vehicles, a pressure sensor for measuring the pressures of the air or oil used as support media, is preinstalled for load measurement of the suspension. Vehicles with a normal suspension system inclusive of a load sensor preinstalled for optimal vehicle load, as well as of the above pressure sensor, are also present and these vehicles further have an ability to manage the load on a quantitative basis. Use of the load sensor preinstalled in each such vehicle makes control device cost reduction achievable.

Both the pressure sensor in the hydraulic or pneumatic type of suspension system and the load sensor in the normal type of suspension system allow easy calculation of suspension displacements, based upon the suspension spring constant of the vehicle, so that these sensors may be used as a substitute for the stroke sensors. This, in turn, allows cost reduction of the control device and enhancement of reliability through reduction in the number of parts required.

Next, the vehicle weight determination unit 109 is described below. As described above, the vehicle weight determination unit 109 calculates the wheel loads of each wheel by, for example, multiplying, by a known suspension spring constant, the displacement of the corresponding suspension that was detected using an element such as the stroke sensor of the suspension system, and totalizes the calculated wheel loads. In this case, however, there is a need, for example, to measure the constant of the suspension spring beforehand and store the measured value into the control device.

Vehicles in recent years usually have an anti-lock brake system, an anti-skid brake system, and/or other advanced vehicle-chassis control devices for the purpose of enhancement of safety, and an acceleration sensor for measuring the longitudinal acceleration of the vehicle chassis is preinstalled in these vehicles.

In electric vehicles, a driving torque value can be estimated very accurately from a current supplied to a motor. Since the vehicle weight is accurately calculable from the driving torque value and the acceleration of the vehicle chassis, therefore, data measurements on these factors may be used as a substitute for the vehicle weight measurement based upon the load sensor. This also allows cost reduction of the control device and the enhancement of reliability through reduction in the number of parts required.

In addition, it has been described in the above embodiment that the pitching state quantity detector 108 detects the pitching angle from, for example, the differential height by use of the stroke sensors of the front and rear suspensions, but as in foregoing expression (10), the pitching angle itself is unnecessary for the calculation of the torque correction value. Instead, the pitch rate may suffice. If this is the case, there is an advantage in that noise-free measurement signals can be obtained at lower costs by calculating the speed based upon integration of the data measurements of the acceleration sensor mounted at an upper section of the suspension, rather than by differentiating data measurements using generally expensive stroke sensors. This simplifies the sensor configuration, enabling cost reduction of the control device and the enhancement of reliability through reduction in the number of parts required.

Additionally, a particular method of vehicle operation may cause almost no significant changes in vehicle weight, rendering highly accurate measurement of the vehicle weight unnecessary each time the vehicle is operated. For a truck used in such applications as transporting a specific load between two sites by shuttle, since only a fully loaded state and an unloaded state exist, these states may be detected using, for example, a load existence detection switch, if not measured with an expensive sensor. More conveniently, it usually suffices just to have the vehicle driver selectively enter whether the load is present or absent, with a switch. Even for passengers, not the load, recent vehicles usually have seat sensors to deliver a seat-belt warning in terms of safety, and using these sensors makes the number of passengers readily identifiable, so an appropriate weight of the vehicle may be calculable from the number of passengers. This simplifies the measurement of the vehicle weight, enabling cost reduction of the control device and the enhancement of reliability through reduction in the number of parts required.

The example in which only the fully loaded state and the unloaded state may exist for the truck used in such applications as transporting a specific load between two sites by shuttle has been introduced in the above embodiment. In these applications, it is common that an outward route and a homeward route are always used under the fully loaded state and the unloaded state, respectively. In such a case, if it is identifiable whether the vehicle is on its outward route or its homeward route, this means that the appropriate vehicle weight can be estimated.

In transport to and from private land such as a mine, if the outward route and the homeward route are separate routes, setting up markers on the road to allow the vehicle to detect which of the routes will make these markers usable as an alternative for measuring the vehicle weight. If the markers or the like is difficult to set up for a reason such as that of the road being a public road, another possible alternative would be by measuring routes with a GPS device. This simplifies the measurement of the vehicle weight, enabling cost reduction of the control device and the enhancement of reliability through reduction in the number of parts required.

Next, the control gain varying element 110 is described below. Timing of the control constant change/adjustment by the control gain varying element 110 has not been defined in the foregoing description. However, a real-time change in vehicle weight usually does not happen during traveling, it should be avoidable to repeat load measurement, and the calculation, modification, and/or adjustment of the control constant, during control device operation. Otherwise, limited calculation resources of the control device will be wasted, which will in turn lead to unnecessary consumption of a processor memory or in a shortage of CPU power. In general, the vehicle weight is considered to change when the vehicle is unloaded or when passengers get on and off the vehicle. Therefore, a door, for example, that opens and closes during unloading may have a switch and then an update operation on the control constant, such as a change and/or an adjustment, may be performed in open/close timing of the door. This improves the processor of the control device in efficiency, thus allowing cost reduction of the control device.

Other timing of the control constant change/adjustment by the control gain varying element 110 is described below. While the vehicle weight has been regarded as variant in the open/close timing of the door in the above description, the vehicle, as with a dump truck or a container truck, may not have a door and may use a shovel or a forklift truck to load.

In such a case, the vehicle speed may be monitored in advance and then during its stop, update operations on the control constant, such as changes and/or adjustments, may be performed assuming a possibility of the vehicle being unloaded. Alternatively, speed detection may be replaced by side brake switch detection. This improves the processor of the control device in efficiency, thus allowing cost reduction of the control device.

The above description of the present embodiment is summarized below. The pitching control device in the electric vehicle of the present embodiment calculates the pitching target quantity from the acceleration/deceleration or other traveling states of the vehicle and then calculates the torque correction value thereof for increased/reduced driving torque, based upon the differential relative to a detected actual pitching quantity of the vehicle. The control device further provides appropriate adjustment of the control gain, a coefficient for calculating the torque correction value, according to the magnitude of the vehicle weight most closely correlated to the pitching momentum caused by the increase/decrease in driving torque. This, by controlling the driving force of the vehicle, properly controls the pitching motion thereof, thus allowing the driving torque to be further controlled at any time and appropriately, even if the vehicle weight is significantly changed by changes in load and in the number of passengers, and the vehicle to enhance steering stability while ensuring the passengers' riding comfort.

In the pitching control device in the electric vehicle of the present embodiment, a load sensor built into the suspension system may be used as the pitching state quantity detector. Thus, the magnitude of the loads upon each wheel or upon axles can be measured.

If each suspension has a known spring constant, dividing a measured load value by the spring constant facilitates conversion into suspension stroke form. There is a further advantageous effect in that the vehicle weight can likewise be accurately measured by totaling measured data of the entire vehicle.

In addition, in the pitching control device in the electric vehicle of the present embodiment, the vehicle weight can be accurately estimated on a calculation basis if the acceleration/deceleration energy that has been calculated from the driving torque value output from the drive is divided by the vehicle acceleration measured with the acceleration sensor mounted in the vehicle chassis. This provides a further advantageous effect in that accurate calculation of the pitching target quantity and control gain adjustment value based upon the accurate vehicle weight can be implemented.

Furthermore, the pitching control device in the electric vehicle of the present embodiment may use a sensor switch adapted to detect a loading state of the load or passengers on a load-carrying platform or on seats, a selector switch that the driver can directly operate, or any other load-existence indicator switch. The use of any such switch is effective in that the appropriate adjustment of the control gain becomes achievable, even without a sophisticated mechanism or an expensive sensor, by selecting a preset vehicle weight value and using this vehicle weight information in the pitching control device.

Further alternatively, after acquisition of some kind of traveling route information such as position information based upon road-mounted markers or GPS, the loading state of the vehicle may be estimated from the position on the particular route or from other traveling state information such as whether the vehicle is on its outward route or its homeward route, then the preset vehicle weight value may be selected according to the estimated loading state, and the vehicle weight information may be used in the pitching control device. This alternative method yields an advantageous effect in that the appropriate adjustment of the control gain becomes achievable, even without a sophisticated mechanism or an expensive sensor.

Besides, in the pitching control device in the electric vehicle of the present embodiment, after detection of an on/off switch state on opening and closing of doors for passengers access to and exit from the vehicle or for loading/unloading or on other such events, if the door is opened/closed, the number of passengers or the load may be judged to have changed, and an estimated value of the vehicle weight may be updated to renew the control gain adjustment value. This yields an effect in that the control gain can be adjusted in the appropriate timing.

Moreover, in the pitching control device in the electric vehicle of the present embodiment, after vehicle stop determination based upon vehicle speed detection, it may be judged that changes in the number of passengers or in the load are likely to occur with the vehicle stop, and the estimated value of the vehicle weight may be updated to renew the control gain adjustment value. This yields an effect in that the control gain can be adjusted in the appropriate timing.

A further detailed configuration of the present invention is not limited to or by the above embodiment, and any design changes or the like instituted without departing from the scope of the invention are embraced in the invention.

What is claimed is:

1. An electric vehicle with a drive including a motor and a controller, the vehicle comprising:
   pitching state quantity detection means for detecting a pitching-motion state quantity of the vehicle;
   vehicle weight determination means for determining weight of the vehicle;
   pitching target quantity calculation means for calculating a target quantity of a pitching motion of the vehicle at least from the determined vehicle weight; and
   a torque correction calculator for increasing/reducing a driving torque output from the drive;
   wherein: the torque correction calculator increases/reduces the driving torque of the drive according to a particular differential between the pitching-motion state quantity that the pitching state quantity detection means has detected, and a target quantity that the pitching target quantity calculation means has calculated.

2. The electric vehicle according to claim 1, wherein the pitching state quantity detection means is a load sensor built into a suspension system.

3. The electric vehicle according to claim 1, wherein the pitching state quantity detection means is an acceleration sensor mounted above the suspension system or in a neighboring region thereof.

4. The electric vehicle according to claim 1, wherein the vehicle weight determination means calculates the vehicle weight from a driving torque value output from the drive, and from a vehicle chassis acceleration measured by an acceleration sensor installed on the vehicle.

5. The electric vehicle according to claim 1, wherein the vehicle weight determination means selects a preset vehicle weight based on a loading state of the vehicle and a state of a switch whose setting position is adapted to be selected by drivers' operation.

6. The electric vehicle according to claim 1, wherein the vehicle weight determination means selects a preset vehicle weight based on a traveling route of the vehicle and a direction of the route.

7. A pitching control device for an electric vehicle with a drive including a motor and a controller, the control device comprising:
   pitching state quantity detection means for detecting a pitching-motion state quantity of the vehicle;
   vehicle weight determination means for determining weight of the vehicle;
   pitching target quantity calculation means for calculating a target quantity of a pitching motion of the vehicle at least from the determined vehicle weight; and
   a torque correction calculator for increasing/reducing a driving torque output from the drive;
   wherein: the torque correction calculator increases/reduces the driving torque of the drive according to a particular differential between the pitching-motion state quantity that the pitching state quantity detection means has detected, and a target quantity that the pitching target quantity calculation means has calculated.

8. The electric-vehicle pitching control device according to claim 7, wherein the pitching state quantity detection means is a load sensor built into a suspension system.

9. The electric-vehicle pitching control device according to claim 7, wherein the pitching state quantity detection means is an acceleration sensor mounted above the suspension system or in a neighboring region thereof.

10. The electric-vehicle pitching control device according to claim 7, wherein the vehicle weight determination means calculates the vehicle weight from a driving torque value output from the drive, and from a vehicle chassis acceleration measured by an acceleration sensor installed on the vehicle.

11. The electric-vehicle pitching control device according to claim 7, wherein the vehicle weight determination means selects a present vehicle weight based on a loading state of the vehicle and a state of a switch whose setting position is adapted to be selected by drivers' operation.

12. The electric-vehicle pitching control device according to claim 7, wherein the vehicle weight determination means selects a preset vehicle weight based on a traveling route of the vehicle and a direction of the route.

* * * * *